June 23, 1942.    R. B. PRICE    2,287,450
BELT TIGHTENER
Filed March 14, 1941    2 Sheets-Sheet 1

Inventor
Robert B. Price.
By Archibald R. McCollum
Attorney

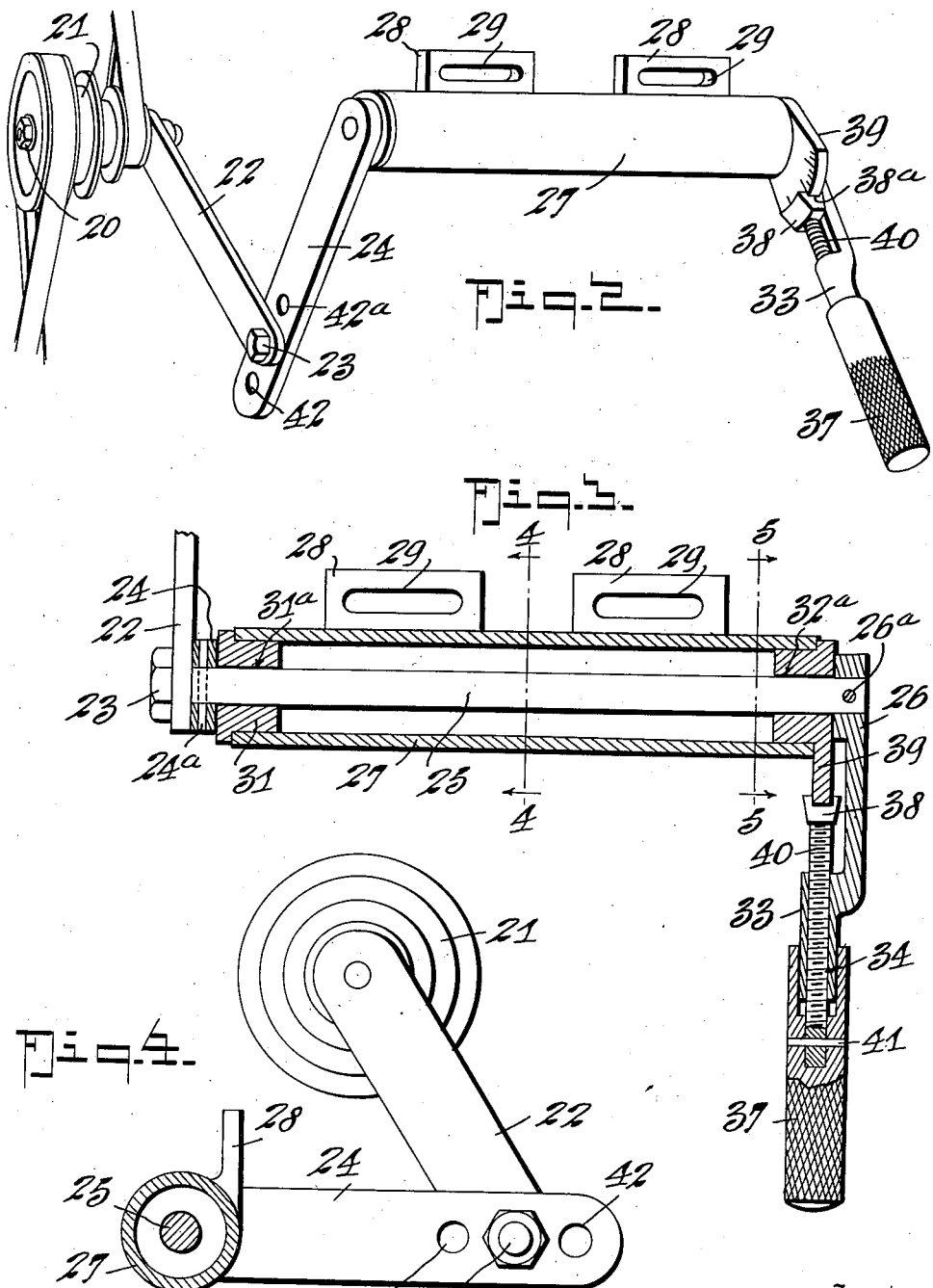

Patented June 23, 1942

2,287,450

UNITED STATES PATENT OFFICE 2,287,450

BELT TIGHTENER

Robert B. Price, Tulsa, Okla.

Application March 14, 1941, Serial No. 383,409

1 Claim. (Cl. 74—242.15)

This invention relates to speed change devices, and more particularly to adjustable sheaves for transmission belts and control devices therefor.

An object of the present invention is to provide for equalizing belt tension of plural transmission belts.

Another object of the invention is to provide a simple and reliable mechanism to expedite the removal and/or the adjustment of transmission belts.

Another object of the invention is to provide belt tensioning control mechanism whereby to increase the safety of machines utilizing such drive means.

Another object of the invention is to provide a mechanism including stepped sheaves and plural transmission belts thereon for greater selection of speeds.

Another object of the invention is to provide for an even spread of speed changes for mechanisms actuated by plural transmission belts.

Another object of the invention is to provide a simple and durable mechanism whereby the application of proper belt tension is facilitated.

Another object of the invention is to provide convenient and compact mechanism for eliminating adverse belt stretching in making changes from any predetermined sheave steps to other steps.

Another object of the invention is to provide, in a device of the character described, manually controlled mechanism for accurately selecting and rigidly maintaining a predetermined adjustment.

For the purpose of illustrating the invention there is shown in the accompanying drawings one form thereof which is at present preferred. Such form herein specifically described has been found in practice to give satisfactory and reliable results; however, it is to be understood that the various instrumentalities comprised by the invention may be variously arranged and organized, and that the invention is not to be limited to the precise arrangement and organization of the instrumentalities as herein shown and described.

Referring to the drawings wherein identical reference characters indicate like parts:

Fig. 2 is a fragmentary enlarged perspective view showing the present adjustment control mechanism;

Fig. 3 is an axial section showing the mechanism of Fig. 2;

Fig. 4 is a section taken on the line 4—4 of Fig. 3; and

It will be understood that the adjustment control mechanism illustrated in the accompanying drawings may be applied with or without modification to a multitude of machine tools such as drill presses, band saws and turning lathes wherein varying operating speeds are required, such machine tools commonly being characterized by parallel spaced shafts, one of said shafts constituting the driving member and the other constituting the driven member.

Figure 1:
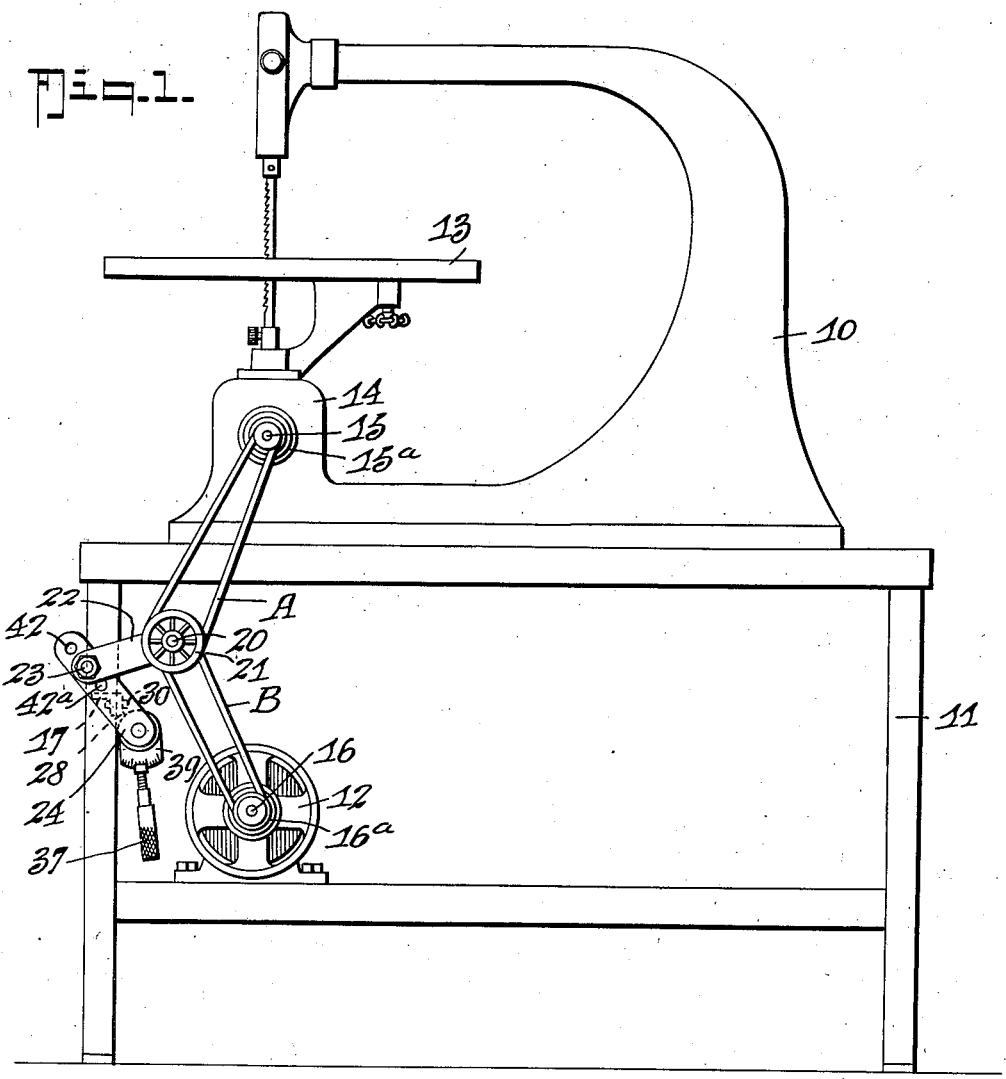
Fig. 1 represents schematically a side elevation of an otherwise conventional jig-saw but having operatively mounted thereon one embodiment of the present invention.
Figure 5:
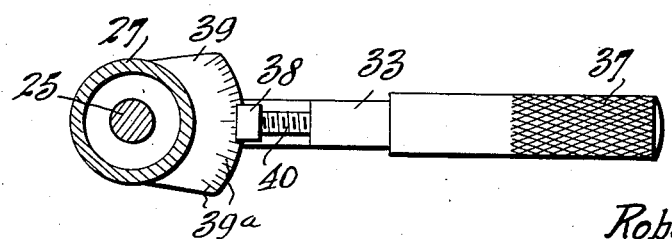
Fig. 5 is a section taken on the line 5—5 of Fig. 3.

Referring particularly to Fig. 1, a jig-saw 10 carried by a stationary base 11 is actuated by any prime mover or motor 12 preferably rigidly mounted thereon. A work table 13 surmounts a gear box 14, the latter including a driven or work shaft 15 carrying a stepped sheave 15a rotatable on an axis preferably parallel with the axis of driving or motor shaft 16 carrying a stepped sheave 16a. Laterally disposed with respect to shafts 15 and 16 base 11 includes a projecting lug 17 for supporting the adjustment control mechanism.

Spindle 20 of steel or other suitable metal supports a floating sheave 21. Sheave 21 is preferably a metal four-step sheave rotatable on the spindle and having standard sealed-for-life bearings not shown. Spindle 20 is fast to the free end of arm 22, said arm being supported at its opposite end by a special double locked bolt 23 in one end of steel arm 24. It will be understood that bolt 23 extends through suitable apertures in arms 22 and 24 whereby arm 22 is permitted to move about bolt 23 in response to the tensions of its belts and with only sufficient friction as to inhibit its accidental displacement when the belts are slack.

At its opposite end arm 24 is rigidly connected by 24a to a metal shaft 25 extending at right angles between arm 24 and metal arm 26, and being rigidly connected to the latter by metal pin 26a. It will be observed that the structure described will cause arm 24, shaft 25, and arm 26 to act as a single rigid unit whereby when arm 26 is rotated arm 24 will move in the same direction. It will also be observed that rotation of arm 26 will cause arm 22 to advance or retract floating sheave 21 with respect to the common plane of sheaves 15a and 16a.

A supporting housing 27 preferably consisting of a cylindrical casting includes lateral fixed ears 28 and 28a and each of said ears is provided with a slot 29 for the reception of a lock bolt 30. Lock bolts 30 engage base lug 17 to rigidly secure the adjustment control mechanism in position on the machine base. At one end cylindrical housing 27 fixedly receives cylindrical bearing 31 and at the other end the housing fixedly receives cylindrical bearing 32. It will be observed that cylindrical bearing 31 is provided with an axial bore 31a and bearing 32 has an axial bore 32a. In these bores opposite ends of steel shaft 25 are rotatable.

The outer extremity of radial arm 26 is provided with a boss or enlarged portion 33, said portion 33 having a bore 34 which is internally threaded. An elongated metal handle 37 is knurled to facilitate manual rotation and is counterbored to receive the extremity of radial arm 26 and be rotatable thereon. A pressure shoe 38 has a slotted arcuate face 38a to receive a segmental rim 39 preferably integral with cylindrical bearing 32, the segmental rim being provided with spaced graduations 39a of any desired scale for enabling location of the pressure shoe 38 thereon in any position of predetermined adjustment. Pressure shoe 38 is carried on one end of threaded rod 40, the shank of which screws into the internally threaded bore 34. The opposite end of rod 40 is fixed to handle 37 by means of pin 41 extending therethrough as a rigid connection.

From the foregoing it will be observed that bearings 31 and 32, which have been drilled to size of shaft 25 will support the shaft while allowing its free rotation when radial arm 26 is swung in either direction. By its rigid attachment to base 11, it will be observed that housing 27 supports the adjustment control mechanism as a unit.

The operation of the device will be apparent from the foregoing description and the observation that when shaft 25 is turned in a counter-clockwise direction, as viewed in Fig. 1, spindle 20 and sheave 21 will be moved laterally from the vertical plane of shafts 15 and 16. In this operation the friction controlled slippage of arm 22 on bolt 23 will insure equalization of the tension on belt A on sheave 15a and belt B on sheave 16a. When the desired adjustment has been made the handle 26 is locked by twisting knurled handle 37. This advances threaded rod 40 to cause the pressure shoe 38 rigidly to clamp against graduated rim 39. By reference to the graduations 39a on segmental rim 39 such position may be established with exactitude in accordance with known standards corresponding, for example, with the scheduled speed of drive, belt dimensions and diameters of selected sheave steps.

With a thorough understanding of the operation of the present adjustment control mechanism obtainable by any competent mechanic the machine is established for safe and efficient operation in a few seconds; and operation of the machine after such adjustment is established may be continued indefinitely without possibility of deterioration of adjustment.

Upon stoppage of the machine, or when it is desired to change the position of the belts with respect to the sheaves, or to replace the belts, or to alter their tension for any reason, the adjustment may be conveniently accomplished by manually twisting handle 37 which thus turns threaded rod 40 to withdraw the pressure shoe 38 from the segmental rim 39. Arm 26 may then be swung in a clockwise direction, as viewed in Fig. 1, thus causing arm 24 to rotate in a similar direction in housing 27 and thrust arm 22 to carry sheave 21 toward the common plane of sheaves 15a and 16a. This movement frees belts A and B so that they will hang slack, whereupon handle 37 may be twisted to lock the control mechanism in free position. Belts A and B may then be readily removed over the sheaves or transferred to other steps thereof without involving any deleterious stretching of the belts. Upon desired re-location of belts A and B on the newly selected steps, handle 37 may be twisted to loosen engagement of pressure shoe 38 and the belts may be restored to desired operating tension by swinging arm 26 in a counter-clockwise direction until pressure shoe 38 is brought in proper registry with the graduations 39a, whereupon the adjustment control mechanism may be rigidly locked in position by twisting handle 37 and causing the pressure shoe 38 to grip segmental rim 39.

The described mechanism gives longer life to the belts by its convenient and automatic distribution of equal pressure on both A and B belts, since if one belt has a higher tension than the other it will undergo more rapid fatigue and deteriorate rapidly. Due to the provision of slippage of arm 22 with respect to arm 24, it is impossible for either of belts A or B to have a different belt tension. The relatively large travel of floating sheave 21 provided by the system of interconnected arms described above enables the floating sheave almost instantaneously to be moved toward the plane of the driving and driven shafts and the ample slack thus caused in belts A and B insures they may be moved readily with respect to the sheaves or removed entirely, and replaced with different belts.

The described mechanism enhances the safety of the machine as a result of the critical adjustment and tensioning of the belts by positioning the pressure shoe at any desired point on the arcuate or segmental rim 39. With the smallest belt tension possible for safe operation, if tools jam or work causes the machine to labor, immediately belt A or belt B may slip over the pulley face and thereby protect both the work and the operator.

Alternate bolt holes 42 and 42a are provided in arm 24 to receive bolt 23, and adapt the mechanism for installation on either large or small machines.

It will be understood that although reference has been made above to the use of steel in the manufacture of some of the parts, obviously such elements may be constructed of any of the conventional materials. Also it will be clear that the invention is readily susceptible of efficient utilization regardless of whether the belts are V-shape, round or flat in cross-section, and whether the sheaves are unitary in structure or assembled on their spindles.

Having thus described the invention and what is hereby claimed as new and desired to be secured by Letters Patent is:

In an adjustment control mechanism for plural transmission belts, a fixed housing having a segmental portion, a radially adjustable element therein, a threaded member adjustable in said element and carried thereby, a rotatable handle on said radial element, and a pressure plate on said threaded member for locking engagement with said segmental portion upon actuation of said handle.

ROBERT B. PRICE.